June 26, 1956 — M. KASSER — 2,752,250
COATING FRUIT
Filed April 17, 1952
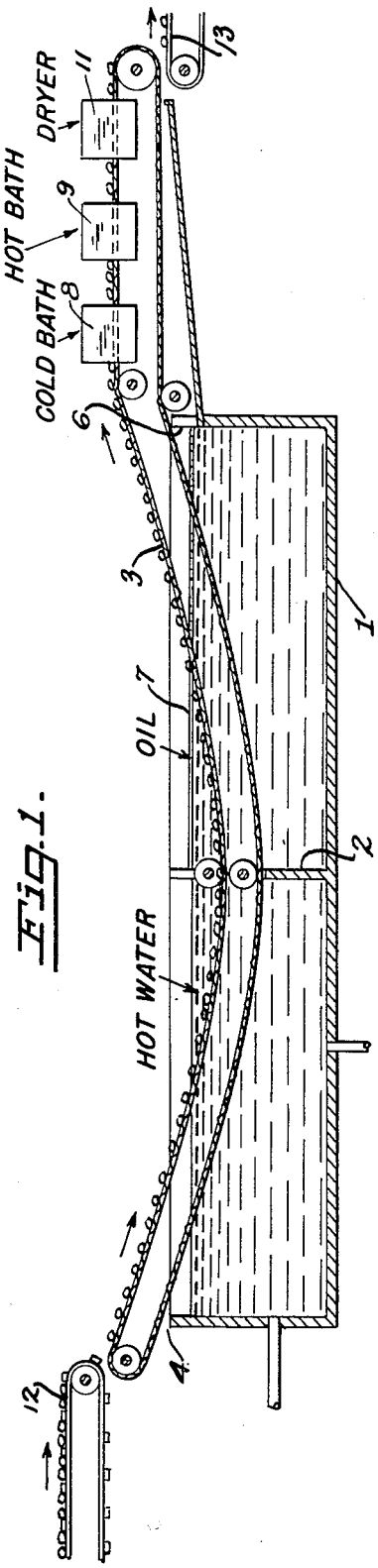
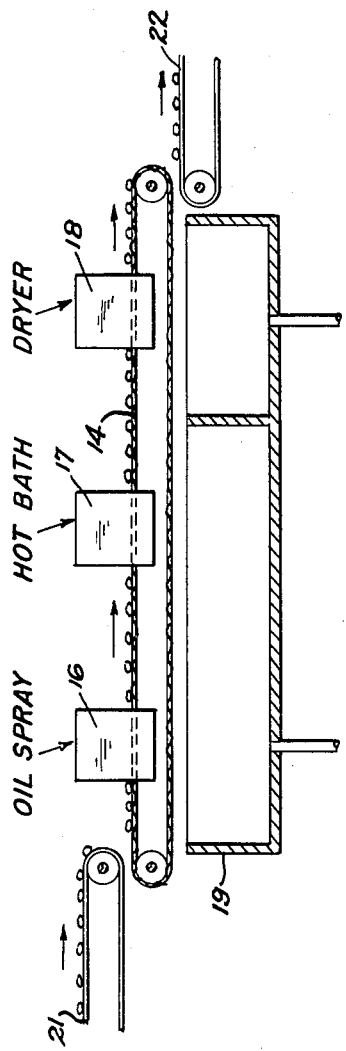
INVENTOR.
MORRIS KASSER
BY George B White
ATTORNEY

2,752,250
COATING FRUIT

Morris Kasser, Roseville, Calif.

Application April 17, 1952, Serial No. 282,765

3 Claims. (Cl. 99—168)

This invention relates to a method and apparatus for treating food products and particularly dried fruit for applying a coating to inhibit rancidity, discoloration and to improve the appearance of the processed product.

An object of the invention is to apply a protective coating to a food product, and particularly to dried fruit, so that crevices of the surface of the product as well as the more exposed surfaces are effectively coated.

Another object of the invention is to apply a protective coating to food products and particularly to dried fruit so that only a very thin coating remains on the product which is sufficient to keep dried fruits soft and pliable and prevent molding or rancidity yet the residual coating is practically imperceptible to taste or touch, but imparts a lustrous, enamel-like appearance to the skin of the product.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a diagrammatic view of an apparatus for treating fruit in accordance with my invention.

Fig. 2 is a diagrammatic view of a modified form of said apparatus.

Food products and particularly dried fruits, such as figs, prunes and raisins, frequently develop unsightly coating, for instance of crystalline sugar. In connection with dried fruits this coating is caused by the exuding fruit juices which leave a residue after the moisture evaporates therefrom. In order to inhibit such unsightly coating various substances were used to cover the surface of such food products. The disadvantages of the previously used coatings were that the coatings were comparatively thick and left a noticeable taste strange to the particular food product and that such coatings unfavorably affected the appearance of the food product. For instance, raisins or prunes treated with oil not only have a taste of the oil but they actually leave oil drippings on any contacting surface. A further disadvantage of previous methods was that the coating did not penetrate into the crevices of the surface of the food product.

By my process a brilliant, lustrous, shiny surface is produced enhancing the natural appearance of the product, yet the residual coating substance on the food product is practically imperceptible to taste and enters into and covers even the finest crevices or pores of the surface of the food product. This proved of particular importance on dried prunes, figs and raisins.

The coating substance used in my method is preferably an oily substance capable of producing the desired luster and treated to prevent its turning rancid. Examples of such substances are anti-oxidant vegetable oil with or without anti-oxidant substances therein, or mineral oils which in the minute traces left by the method are totally harmless.

In carrying out my method, broadly, the fruit is coated with said protective luster producing coating material, then said coating material is forced into the crevices and pores of the fruit, and finally the surplus coating material is removed selectively so as to leave only a minute trace of coating on the surface of the fruit.

In detail the individual steps are modified or combined as desired for the particular food product to be treated.

As an example, in the treatment of dried prunes, the prunes are passed through hot water to add some moisture content, and then sealed by coating of suitable vegetable oil, for instance by carrying the prunes on a screen conveyor so that the surface of each prune is exposed, first through the hot bath and during the emergence of the conveyor and the prunes from said hot bath passing the prunes through a layer of said oil on the surface of said bath. Then the oil coated prunes are passed by such screen conveyor through steam or hot water wash, which spreads said oil over and into the crevices and pores of the skin of the prunes, and also dissolves or washes off a selected amount of surplus coating determined by the length or strength of the exposure to steam or hot water wash, either by spray or by passing through a hot water bath so as to leave only a trace or a comparatively thin or minute layer of coating. This wash is performed before the oil on the fruit can congeal or harden. Then the product is suitably dried and packed. The result is a lustrous protective coating which is practically imperceptible to taste, smell or touch. This method has also a cleaning function because the sprays or washes dissolve impurities such as bacteria and sediments which are removed by the final wash with the surplus oil.

In the event it is desirable to force the coating more intensely into the crevices or pores of the fruit, the coated fruit, while still hot and before the removal of surplus coating, is cooled or chilled, for instance by a cold shower, so as to contract pores and fine crevices of the skin and confine the oil therein.

In connection with dried products, for instance apricots, which are not subjected to hot water treatment, the product is carried on a screen conveyor with all sides exposed through an oil bath, such as by spraying, to apply the coating, and then through steam or hot water bath to spread or force the coating into the crevices of the skin and to remove a desired surplus of coating material as heretofore described, and finally through a suitable drier, on a continuous path.

The illustrative embodiment of the apparatus for treating such products shown in Fig. 1 includes a tank 1 which has a vertical partition 2 transversely across its upper portion. A screen conveyor 3 extends from the top of the intake end 4 of the tank 1 down to the lower portion of said tank 1, and it passes under the partition 2 and then upwardly to the top of the outlet end 6 of the tank 1. The tank 1 has hot water in it up to a level spaced from the top of the tank 1. Between the partition 2 and the outlet end 6 of the tank 1 is a layer of coating material 7, such as a suitable coating oil, on the surface of the hot water so that the fruit is passed through said coating oil as it emerges from the hot water.

The screen conveyor is of such mesh or perforation, as to prevent the dropping of the fruit through it yet expose the fruit thereon to treatment from both sides of the conveyor. This screen conveyor is an endless conveyor and it is driven in any suitable manner not shown.

The portion of the screen conveyor 3 at the outlet end 6 of the tank 1 passes in sequence through a suitable cooling device 8, then a suitable steam or hot water spraying device 9 and finally a suitable preferably blower drying chamber or device 11, which are indicated diagrammatically herein, because each may be of any suitable construction available at present.

A suitable intake conveyor 12 delivers and dumps the fruit on the intake end of the screen conveyor 3. A suitable belt conveyor 13 receives the treated fruit from the outlet end of the screen conveyor 3 and carries the treated fruit to the usual inspecting and packaging places.

In the illustrative embodiment of my apparatus shown in Fig. 2 an endless screen conveyor 14 is arranged in a horizontal plane and carries the fruit, in sequence, through a suitable coating chamber 16 preferably provided with oil spraying elements, then through a coating removal chamber or device 17, preferably of the steam or hot water spray type, and finally through a drying device 18, preferably of the blower type.

A divided pan 19 under said conveyor collects the oil drippings under the coating chamber 16, and collects the drainage from the coating removal device 17 and drying device 18.

A suitable feed conveyor 21 delivers the product into said screen conveyor 14, and the treated product is dumped onto and carried away by a suitable belt conveyor 22 under the discharge end of the screen conveyor 14.

I claim:

1. In a process of applying a shiny sealing coating to fruit, the steps of coating the surface of said fruit with an oily material capable of producing luster, subjecting said coated surface to a spray of hot water until a selected trace of said material is left on said surface, and forcing said trace of material into the crevices and pores of said surface.

2. In a process of applying a shiny sealing coating to fruit, the steps of coating the surface of said fruit with an oily material capable of producing luster, subjecting said coated surface to steam under pressure so as to precipitate the steam on the surface until portion of said coating is washed off leaving only a sufficient trace on said surface to render said surface lustrous, and simultaneously forcing said trace into the crevices and pores of said surface by the pressure of said steam.

3. In a process of applying a shiny sealing coating to fruit, the steps of coating the surface of said fruit with an oily material capable of producing luster, subjecting said coated surface to hot water so that said material penetrates into the crevices and pores of said surface and until portion of said coating is washed off leaving only a sufficient trace on said surface to render said surface lustrous.

References Cited in the file of this patent

UNITED STATES PATENTS

| | | |
|---|---|---|
| 1,672,736 | Skinner | June 5, 1928 |
| 1,672,737 | Skinner | June 5, 1928 |
| 1,692,286 | Brogden | Nov. 20, 1928 |
| 1,985,842 | Skinner | Dec. 25, 1934 |
| 2,033,044 | McDill et al. | Mar. 3, 1936 |
| 2,039,280 | Brogden | May 5, 1936 |
| 2,128,028 | Hampton | Aug. 23, 1938 |
| 2,174,838 | Repp | Oct. 3, 1939 |
| 2,285,841 | Sharma | June 9, 1942 |
| 2,372,225 | Rieke | Mar. 27, 1945 |